United States Patent
Zami

(10) Patent No.: US 9,215,030 B2
(45) Date of Patent: Dec. 15, 2015

(54) ALLOCATION OF SPECTRAL CAPACITY IN A WAVELENGTH-DIVISION MULTIPLEXING OPTICAL NETWORK

(75) Inventor: Thierry Zami, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/238,651

(22) PCT Filed: Aug. 8, 2012

(86) PCT No.: PCT/EP2012/065525
§ 371 (c)(1),
(2), (4) Date: Feb. 12, 2014

(87) PCT Pub. No.: WO2013/037570
PCT Pub. Date: Mar. 21, 2013

(65) Prior Publication Data
US 2014/0233956 A1      Aug. 21, 2014

(30) Foreign Application Priority Data
Sep. 16, 2011  (EP) ..................................... 11181595

(51) Int. Cl.
*H04J 14/02*   (2006.01)

(52) U.S. Cl.
CPC ............ *H04J 14/0227* (2013.01); *H04J 14/02* (2013.01); *H04J 14/0257* (2013.01); *H04J 14/0267* (2013.01)

(58) Field of Classification Search
USPC .................................................. 398/729, 79
See application file for complete search history.

(56) References Cited

U.S. PATENT DOCUMENTS

| 2002/0093711 A1* | 7/2002 | Simmons | ............ | H04J 14/0228 |
| | | | | 398/79 |
| 2002/0126943 A1* | 9/2002 | Foltzer | ................. | G02B 6/3542 |
| | | | | 385/15 |

(Continued)

FOREIGN PATENT DOCUMENTS

| GB | 2329291 | 3/1999 |
| JP | 2011010188 | 1/2011 |

(Continued)

OTHER PUBLICATIONS

Morioka, T.; Future Innovative Optical Transport Network Technology; NTT Technical Review, Japan, The Telecommunications Association; Mar. 1, 2011; vol. 23, No. 3; pp. 32 to 36.

*Primary Examiner* — David Payne
*Assistant Examiner* — Omar S Ismail
(74) *Attorney, Agent, or Firm* — Patti & Malvone Law Group, LLC

(57) ABSTRACT

A method for allocating spectral capacity in a WDM optical network comprising: —providing (4) a group of connection demands, —defining a group of candidate lightpaths that are adapted to carry an optical signal transparently, —defining a highest admissible spectral efficiency for each candidate lightpath, —computing (6) a respective spatial path for each connection demands, —for each candidate lightpath, determining the connection demands that match the candidate lightpath and computing its (1 2) spectral resource saving as a function of the difference between the spectral resources that would be used with its highest admissible spectral efficiency and the spectral resources that would be used with its reference spectral efficiency for the total capacity of the matching connection demands, —selecting (14) and allocating spectral resources to the candidate lightpath having the highest admissible spectral resource saving, —removing (14) the selected candidate lightpath and iterating to the step of determining the matching connection demands.

14 Claims, 4 Drawing Sheets

(56) References Cited

U.S. PATENT DOCUMENTS

| | | |
|---|---|---|
| 2003/0072052 A1 | 4/2003 | Graves et al. |
| 2006/0251419 A1 | 11/2006 | Zadikian et al. |
| 2010/0014859 A1* | 1/2010 | D'Alessandro ..... H01J 14/0284 398/48 |
| 2010/0028006 A1* | 2/2010 | Guy .................... H04J 14/0246 398/79 |
| 2010/0129078 A1 | 5/2010 | Weston-Dawkes et al. |
| 2012/0070150 A1* | 3/2012 | Patel .................. H04J 14/0267 398/79 |
| 2012/0201541 A1* | 8/2012 | Patel .................. H04J 14/0212 398/58 |
| 2014/0016939 A1* | 1/2014 | Patel .................. H04J 14/0227 398/79 |

FOREIGN PATENT DOCUMENTS

| | | |
|---|---|---|
| WO | 2005032076 | 4/2005 |
| WO | 2010032844 | 3/2010 |

* cited by examiner

ALLOCATION OF SPECTRAL CAPACITY IN A WAVELENGTH-DIVISION MULTIPLEXING OPTICAL NETWORK

FIELD OF THE INVENTION

The invention relates to the technical field of wavelength-division multiplexing (WDM) optical networks, and more particularly to methods for allocating the spectral capacity in such networks.

BACKGROUND

Within core and metropolitan optical networks, data are transmitted by optical signals aligned on regular grids of optical frequencies with regular channel spaces equal to 400 GHz, 200 GHz, 100 GHz or 50 GHz standardized by the international Telecommunication Union (ITU). The shortest channel spaces correspond to the higher spectral efficiencies and therefore make it possible to transport more capacity. Those channels spaces also correspond to the most detrimental physical degradations such as non-linear impairments during propagation along the optical fibers. Filtering and isolation issues also cause degradation of the optical signals in transparent optical network nodes. The grid standardization is convenient for the optical transparency because it makes it easier to transfer optical signals from network link to network link across the optical nodes in a transparent manner without costly conversion in the electronic domain.

The recent advent of coherent detection for high data rate transmission combined with the availability of bandwidth-agile Wavelength Selective Switches raised the interest for optical transmissions with non-standard channel spacing.

US2006/251419 describes a method to allocate bandwidth from a first node to a second node in a optical network of nodes coupled by optical links. The method begins by accepting a request from an end-user, who requests a virtual path between the first node and the second node. The virtual path has a bandwidth requirement associated therewith. A physical path between the first and the second nodes is selected from a number of such physical paths. The service provider then determines whether the physical path has enough available bandwidth to meet the bandwidth requirement of the requested virtual path. The steps of selecting a physical path and determining the available bandwidth for the physical path are repeated until either an acceptable physical path is found, or every one of the plurality of physical paths has been selected. If an acceptable physical path is found, the acceptable physical path is allocated.

GB2329291 describes a wavelength division multiplexing optical fiber subscriber network capable of expanding the number of subscribers. An allocation of bandwidth method for requested services is carried out in a central office of the optical fiber subscriber network. If a service request signal is received, an exchange controller determines the available remaining bandwidth of each optical wavelength of a subscriber group, from the first optical wavelength towards the last optical wavelength. It determines whether the detected remaining bandwidth on each wavelength is wider than or equal to the service requested bandwidth, until a wavelength with sufficient remaining bandwidth is identified. When the available bandwidth for any one of the subscriber optical wavelengths is equal to or wider than the requested service bandwidth, the controller of the exchange allocates the requested bandwidth to provide the requested service to the requesting subscriber.

US2003/072052 describes an optical wavelength distribution method to allocate wavelength in a network in order to optimize non-blocking traffic throughput to a core network. The network provides network end-to-end transport based upon the allocation of optical carriers of specific wavelengths and implements the distribution of the appropriate optical carriers to achieve the required end-to-end wavelength path connection across the network.

SUMMARY

In an embodiment, the invention provides a method for allocating spectral capacity in a WDM optical network comprising a plurality of optical switching nodes connected by a plurality of optical links, the method comprising:

providing a group of connection demands, a connection demand comprising a source node, a destination node and a capacity which needs to be transmitted between the source node to the destination node, defining a group of candidate lightpaths within the optical network, a candidate lightpath comprising an ingress node, an egress node and a sequence of one or more optical links that are adapted to carry an optical signal transparently from the ingress node to the egress node, defining a highest admissible spectral efficiency for each candidate lightpath, computing a respective spatial path for a subset of the connection demands as a function of an available spectral capacity of the optical links and under the assumption that the connection demands are fulfilled using a reference spectral efficiency, for each candidate lightpath, determining the connection demands of the subset of connection demands that match the candidate lightpath, wherein a matching connection demand has a spatial path that includes the whole sequence of one or more links of the candidate lightpath, and computing a spectral resource saving of the candidate lightpath as a function of the difference between the spectral resources that would be used for the total capacity of the matching connection demands of the candidate lightpath by using the highest admissible spectral efficiency of the candidate lightpath and the spectral resources that would be used for the total capacity of the matching connection demands of the candidate lightpath by using the reference spectral efficiency, selecting the candidate lightpath having the highest admissible spectral resource saving as a lightpath to be established and allocating spectral resources to the selected candidate lightpath as a function of the total capacity of the matching connection demands and the highest admissible spectral efficiency of the selected candidate lightpath, removing the selected candidate lightpath from the group of candidate lightpaths and iterating to the step of determining the matching connection demands for the remaining candidate lightpaths.

According to embodiments, such a method can comprise one or more of the features below.

In embodiments, the method further comprises:

for each connection demand that matches the lightpath to be established, defining an allocated subpath of the connection demand as the part of the spatial path of the connection demand that corresponds to the whole sequence of one or more links of the lightpath to be established, for a remaining candidate lightpath, updating the determination of the matching connection demands under the additional condition that a connection demand having an allocated subpath, wherein the allocated subpath includes one or more links of the remaining candidate lightpath, is not a matching connection demand for the remaining candidate lightpath.

In embodiments of the method, the step of determining the matching connection demands for a candidate lightpath further comprises:

defining a first regeneration counter for each connection demand of the subset, incrementing the first regeneration counter as a function of a number of lightpaths to be established for which the connection demand is a matching connection demand, determining a non-allocated subpath of the connection demand as a part of the spatial path of the connection demand that does not comprise any link of the said lightpaths to be established for which the connection demand is a matching connection demand, determining a second regeneration counter of the connection demand by estimating the number of regenerations on the non-allocated subpath by using the reference spectral efficiency, and computing, for each connection demand of the subset, a virtual regenerations number as a function of the first and second regeneration counters, wherein a connection demand for which the virtual regenerations number would be incremented to become higher than a certain threshold is not a matching connection demand for the candidate lightpath. In embodiments of the method, the virtual regenerations number is computed as a function of estimated physical impairments along the non-allocated subpath of the connection demand by using the reference spectral efficiency. In embodiments, the method further comprises: computing a minimum number of regenerations for a connection demand as a function of estimated physical impairments along the spatial path of the connection demand and computing the threshold as a function of the minimum number of regenerations. In embodiments of the method, the computing of the threshold is made as a linear function of the minimum number of regenerations.

In embodiments of the method, the step of defining a highest admissible spectral efficiency for each candidate lightpath is made as a function of a Bit Error Rate requirement. In embodiments of the method, the step of defining a highest admissible spectral efficiency for each candidate lightpath is made as a function of estimated physical impairments along the sequence of links of the candidate lightpath.

In embodiments of the method, the physical impairments are estimated as a function of parameters chosen among the effective length, the equivalent lengths of the crossed optical network nodes, residual chromatic dispersion, cumulated in-band crosstalk and estimated level of accumulated non-linear effects along the sequence of links.

In embodiments of the method, the step of computing a respective spatial path for a subset of the connection demands is made with a load-balanced routing process based on the shortest distance path.

In embodiments of the method, the subset of the connection demands is defined by computing a spatial path for as many connection demands as possible that do not experience a blocking condition e.g. spectral blocking.

In embodiments of the method, the computing of the spectral resource saving of a candidate lightpath is further made as a function of a cost parameter of the links of the candidate lightpath. In embodiments of the method, the reference spectral efficiency is associated to a combination of a reference channel spacing and a reference signal modulation scheme and the spectral resource saving is computed as an integer number of reference channel spaces. In embodiments of the method, the highest admissible spectral efficiency is associated to a combination of a lowest admissible channel spacing and the spectral resource saving is further computed as a function of the lowest admissible channel spacing and of an additional guardband width adapted to mitigate non-linear interactions and/or crosstalk between lightpaths to be established.

In embodiments of the method, the method further comprises:

selecting a second subset of the connection demands, the second subset of connection demands comprising connection demands that are not included in the first subset of connection demands, updating the available spectral capacity of the optical links by discounting the spectral resources allocated to the lightpaths to be established, reinitializing the group of candidate lightpaths, and iterating the method from the step of computing respective spatial paths for the second subset of connection demands.

The invention also provides a computer program comprising computer-executable instructions that cause a computer to execute one of the above mentioned methods.

Aspects of the invention are based on the idea of providing a method for allocating spectral capacity by combining efficiently the non-standard, regular or irregular optical frequency grids, also referred as 'Elastic channel spacing' (ECS) and the transparency of network nodes. ECS correspond to the ad-hoc tuning of the channel spacing in network links.

An idea at the basis of the invention is to increase the whole capacity of a WDM network corresponding to a given topology and for a given set of connection demands by using elastic channel spacing while keeping under a fair limit the average number of regenerators required per connection.

Aspects of the invention are based on the idea to achieving a specific adaptation of the channel spacing for each connection as function of the distance this connection has to bridge.

Aspects of the invention are based on the observation that core, metro-core and metropolitan networks can spread over large geographical areas and contain several tenths of network nodes. When the number of nodes is so large, if the conventional connection by connection wavelength allocation are used, the probability to have a large number of connections propagating in a same lightpath having the same links, ingress node and egress node decreases.

By contrast, an idea at the basis of the invention is to determine those connection demands which have a common spatial path from source to destination or a common portion in their spatial paths, and to allocate as many of those connection demands as possible to a same lightpath along their common path or path portion. As used herein, a lightpath refers to a transparent optical connection experiencing no optical to electrical conversion from ingress to egress. A lightpath may comprise a plurality of adjacent wavelength channels to transport a total capacity of the corresponding connection demands. By selecting efficient signal modulation methods and/or an optical channel spacing for those wavelength channels, it is possible to make an optimal use of the spectral resources allocated to the lightpath.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

Figure 1:
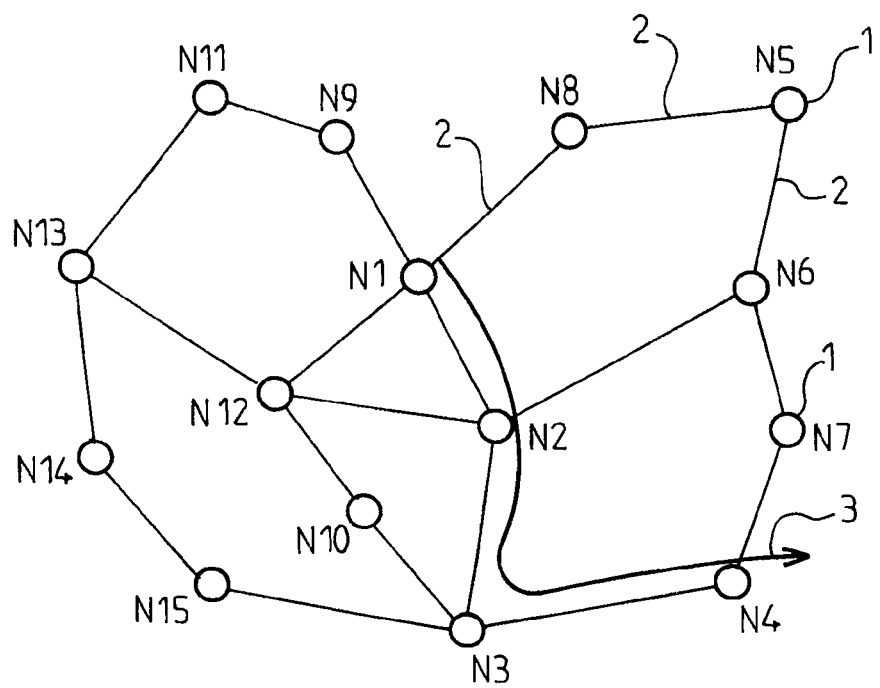
FIG. 1 is a schematic representation of a WDM optical network.

The FIG. 1 shows a WDM optical network. Nodes N1 to N15 are connected through links 2. Those links 2 transport WDM signals. The links 2 are bidirectional pairs of optical fibers, comprising a fiber for transporting a WDM signal from a first node 1 to a second node 1 and a fiber for transporting a WDM signal from the second node 1 to the first node 1.

A connection demand $D_k$ corresponds to a request from a customer for a connection between a pair of source and destination nodes that has a certain capacity. A capacity may be defined as a data rate the customer wants to have and which may be determined in bits per second. For instance, the connection demand 3 is a request for a determined capacity between the node N1 and the node N4.

A method for allocating spectral resources to a set of connection demands in such a network will now be described with reference to FIG. 2.

In an initial stage 4, all spectral resources are released and the network is considered as standard. Therefore, each link has the same number of wavelength channels $N_{ch}$ aligned on the same regular grid of optical frequencies. As the allocation is done on the basis of a set of connection demands $D_k$, an initial list of connection demands is defined as the set of initial connection demands $D_k$ which is denoted demand(0). The connection demands are considered at the granularity of one optical wavelength channel. For that purpose, it is assumed that the grooming at lower levels of granularity has already been done.

Figure 4:
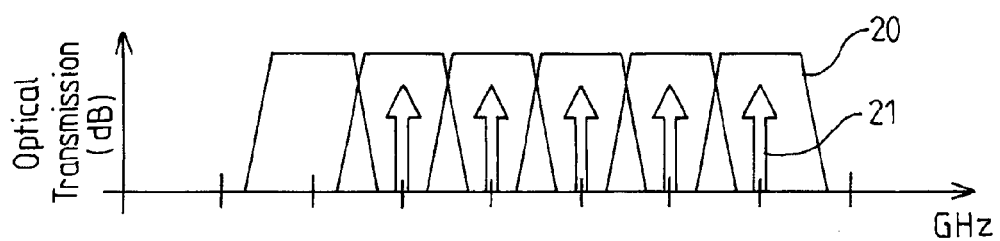
FIG. 4 is an example of a standard wavelength allocation on a standard frequency grid.

For the purpose of route computation, a reference network having a standard frequency grid and a reference modulation rate is considered at first. FIG. 4 illustrates the wavelength allocation inside wavebands that remain aligned on a standard frequency grid. Each signal 21 is allocated to a spectral slot 20. The optical signals are modulated at a reference rate of 100 Gb/s per wavelength channel. However, this modulation rate is not limitative and any different modulation rates may be used as a reference rate.

A first step 5 consists in creating an empty list denoted srd(i) that will be used in step 7. Then, step 6 of the method consists in computing a route for as many connection demands $D_k$ as possible. Each demand is routed one after the other from the set of initial connection demands. This route computation can be done with usual methods such as following the shortest paths that depends of the spectral available resources that are not occupied by the demands previously routed. Moreover, load-balancing methods can be used to achieve this route computation. Load-balancing methods have the advantage to mitigate the imbalance between the loads of the links. This routing is done until no more connection demand from the set of initial connection demands can be routed. Each time a demand is successfully routed, it is added in step 7 to the list of the demands successfully routed srd(i). The remaining connection demands are kept in the set of initial demands for the next iteration of step 6. Index i denotes a number of iterations of the route computation step 6.

In step 6, each link 2 keeps track of all the connection demands that were routed through it. This can be done by storing and updating a list of demands routed by the respective link.

Numeral 8 corresponds to the test that determines the stopping of the method and numeral 10 correspond to the calculation of the minimum number of regenerators. Those steps will be described below A step 11 consists in the determination of a set of candidate lightpaths LocalTL and corresponding spectral efficiencies. We denote {TL} the set of all theoretically feasible lightpaths in the network. However, if the route computation obtained at step 6 has left some portions of the network entirely unoccupied, e.g. due to a lack of connection demands in those portions, it is possible to already exclude some feasible lightpaths from {TL}, i.e. those lightpaths that follow links involved in none of the computed routes. LocalTL(n) denotes one candidate lightpath corresponding to the index "n" in the set of candidate lightpaths LocalTL. From the step 11 to the step 15, the restriction to the reference network with standard frequency grid and reference modulation rate is suppressed. Instead, degrees of freedom are introduced with respect to signal modulation scheme and/or channel spacing. The set of candidate lightpaths consists in all the possible candidate lightpaths that may be used in the network. A candidate light-path corresponds to a succession of one or more links a WDM signal can cover transparently. During the step 12, each candidate lightpath LocalTL(n) is associated to the connection demands of srd(i) that traverse the candidate lightpath from its first node which is called the ingress node until its last node which is called the egress node.

In view of the degrees of freedom introduced in the network, a highest admissible spectral efficiency is determined for each candidate lightpath. This highest admissible spectral efficiency is calculated on the basis of physical impairments and may be determined in bits/(second×Hertz).

Figure 5:
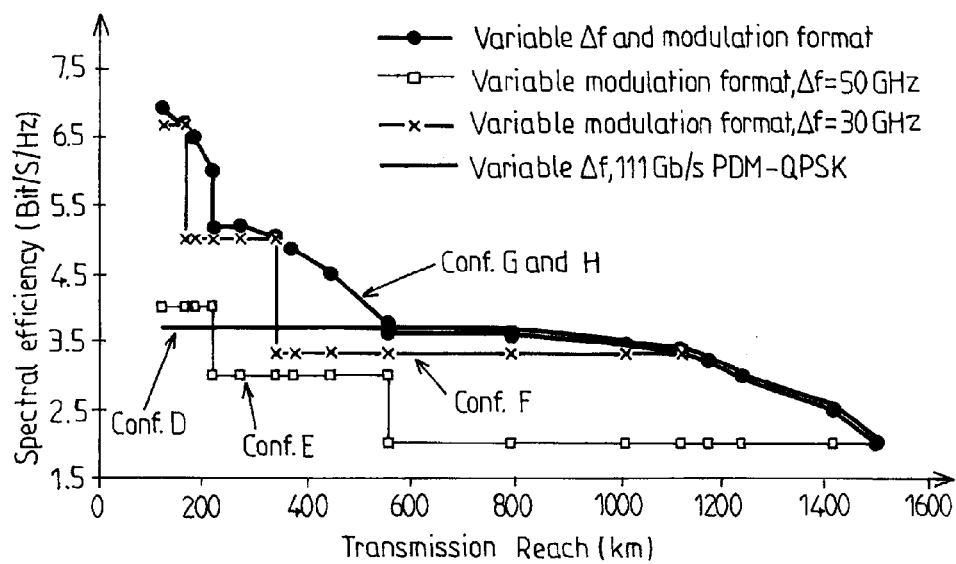
FIG. 5 is a graph showing the highest admissible spectral efficiency in a WDM network as a function of the transmission reach, for different ways of configuring the wavelength channels in a lightpath

The highest spectral efficiency corresponds to a couple of a channel spacing and a signal modulation scheme. Indeed, a lightpath should meet a certain quality of transmission requirement. Therefore, the most efficient couple of a channel spacing and a signal modulation scheme meeting the quality of transmission requirement is determined as a function of physical impairments, i.e. residual chromatic dispersion, cumulated in-band crosstalk and estimated level of accumulated non-linear effects along the sequence of links. Physical models can be used for estimating such physical impairments, e.g. as a function of fiber type, length of fiber, equivalent length of optical nodes, etc. One of those physical models is described in "On the Performance of Nyquist-WDM Terabit Superchannels Based on PM-BPSK, PM-QPSK, PM-8QAM or PM-16QAM Subcarriers" by G. Bosco et al., Page 53, Journal of Lightwave Technology, Vol. 29, n° 1, January 2011. Therefore the highest admissible spectral efficiency and the corresponding couple of channel spacing and signal modulation scheme can be deduced from such models for each candidate lightpath. FIG. 5 shows a graph of the highest spectral efficiency as function of the distance the candidate lightpath covers for different configurations of network as listed in table 1. This graph derives from "On the Performance of Nyquist-WDM Terabit Superchannels Based on PM-BPSK, PM-QPSK, PM-8QAM or PM-16QAM Subcarriers" by G. Bosco et al, JLT, Vol. 29, n° 1, Page 53, January 2011. As used herein, the network configuration refers to the definition of the degrees of freedom introduced in the network.

TABLE 1

| Configuration Names | Channel spacing (GHz) | channel modulation scheme | Optical transparency |
|---|---|---|---|
| D | Flexible (>27.75) | QPSK | Yes |
| E | 50 | Flexible (QPSK or 8QAM or 16QAM) | Yes |
| F | 30 | Flexible (QPSK or 8QAM or 16QAM) | Yes |
| G | Flexible (>27.75) | Flexible (QPSK or 8QAM or 16QAM) | No, opaque network |
| H | Flexible (>27.75) | Flexible (QPSK or 8QAM or 16QAM) | Yes |

Knowing the network configuration and the length of a candidate lightpath, the highest admissible spectral efficiency may be determined for each candidate lightpath with this graph.

The step 14 consists in selecting the transparent lightpath that corresponds to the highest spectral resource saving. This spectral resource saving may be determined in terms of number of saved reference channel spaces. The saving of spectral resources results from the degrees of freedom introduced in the network, i.e. using a lower channel spacing as the reference channel spacing and/or a more efficient modulation scheme as the reference modulation scheme.

For that purpose, a calculation is made in step 12 to calculate SL(n) which indicates how many reference channel spaces can be saved along each candidate lightpath LocalTL (n). The "n" index denotes the respective candidate lightpath localTL(n) in the set LocalTL. Firstly, the connection demands that match a respective candidate lightpath are determined. A matching connection demand corresponds to a connection demand for which the succession of link covered by the candidate lightpath is included in the spatial path of the routed connection demand. As an example, the matching connection demands can be determined by controlling which connection demands are present in all the lists of demands routed by each respective link 2 that form the candidate lightpath. The resulting number of matching connection demands for the respective candidate lightpath is denoted Ch(n), wherein "n" is the index of the respective candidate lightpath in the set LocalTL.

Secondly, the highest number of saved reference channel spaces SL(n) is determined for each candidate lightpath as a function of the minimum number of reference channel spaces necessary to transmit the whole waveband occupied by the matching connection demands associated to the selected candidate lightpath with the channel spacing and modulation scheme that correspond to the highest spectral efficiency.

Figure 6:
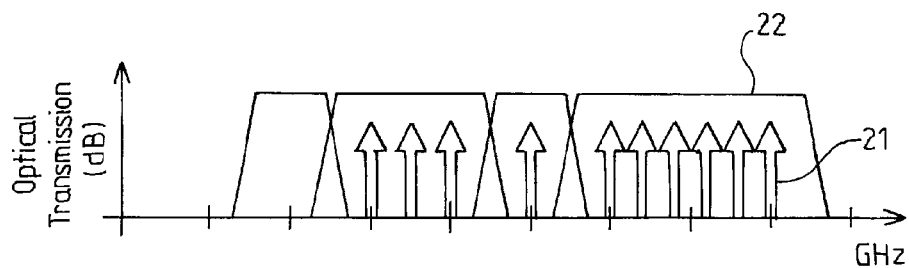
FIG. 6 is an example of elastic wavelength allocation within respective spectral bands aligned on a standard frequency grid.

FIG. 6 is an example of elastic wavelength allocation within waveband 22 that are aligned on a standard frequency grid. The waveband 22 comprises several signals 21 of respective connection demands. The waveband 22 consists of a number of adjacent spectral slots corresponding to the highest spectral efficiency, which occupy a total width equal to an integer number of reference channel spaces.

This expression of the waveband width in an integer number of reference channel spaces advantageously keeps the method compliant with standard WSSs. Indeed, the WSSs are able to optically route the corresponding wavebands along a sequence of links 2 whatever the particular channel spacing inside each waveband is, provided that the edges of waveband 22 remain aligned with the regular optical frequency grid of the WSSs.

A waveband 22 may also integrate the guardband width which corresponds to the "inter-waveband" gaps that are required on each side of the bands to mitigate the non-linear interactions and crosstalk between the adjacent bands propagating inside the same optical fiber, especially if these bands have a very different channel spacing.

The calculation of the number of reference channel spaces saved may further be modified as a function of cost coefficients representing the importance of the links crossed by the lightpath.

The candidate lightpaths are sorted in step 13 from the candidate lightpath having the highest to the lowest saved reference channel spaces SL(n). In the step 14, the candidate lightpath having the highest spectral resource saving from the sorted candidate lightpaths is selected as a lightpath to be established, i.e. spectral resources are allocated to it.

The available spectral capacity of all the bidirectional transmission links making up the lightpath to be established are updated to account for the saved reference channel spaces of the selected candidate lightpath. Hence if they were considered as fully occupied at the route computation step, several channel spaces may be released and so may be available for further connections demands not yet routed.

The connection demands matching the selected candidate lightpath are also removed from the list of demands routed by the respective link 2 making up the selected candidate lightpath.

Simultaneously the spectral resources of the links making up the selected candidate lightpath are allocated to this candidate lightpath. Therefore all the matching connection demands are regrouped together in a superchannel, i.e. a waveband 22, having a bandwidth that can spread on several reference slots on the grid.

The selected candidate lightpath is removed from the set of candidate lightpaths LocalTL.

As indicated by arrow 16 and test 15, the steps 12, 13 and 14 are repeated with the set of candidate lightpaths LocalTL in which the selected candidate lightpath was removed. Therefore, the set of candidate lightpaths gets reduced by one candidate lightpath at each iteration of steps 12, 13 and 14. Steps 12, 13 and 14 are repeated until the whole spatial path of each connection demand from the list of the demands successfully routed srd(i) are associated to allocated spectral resources of lightpaths to be established.

As indicated by arrow 17, the method then goes back to the step 6 to route the connection demands that were previously rejected, demand(i+1), by using network resources released during the step 14. For instance, those connections are connections rejected due to a lack of spectral resources in the step 6.

This loop 17 going back to the first step 6 is repeated until all the connection demands of the initial list of connection demands are routed or if the step 14 is no more able to release enough spectral resource for accepting any additional connection demand and computing a route for it, as it is shown by the test 8 and the step 9.

Figure 2:
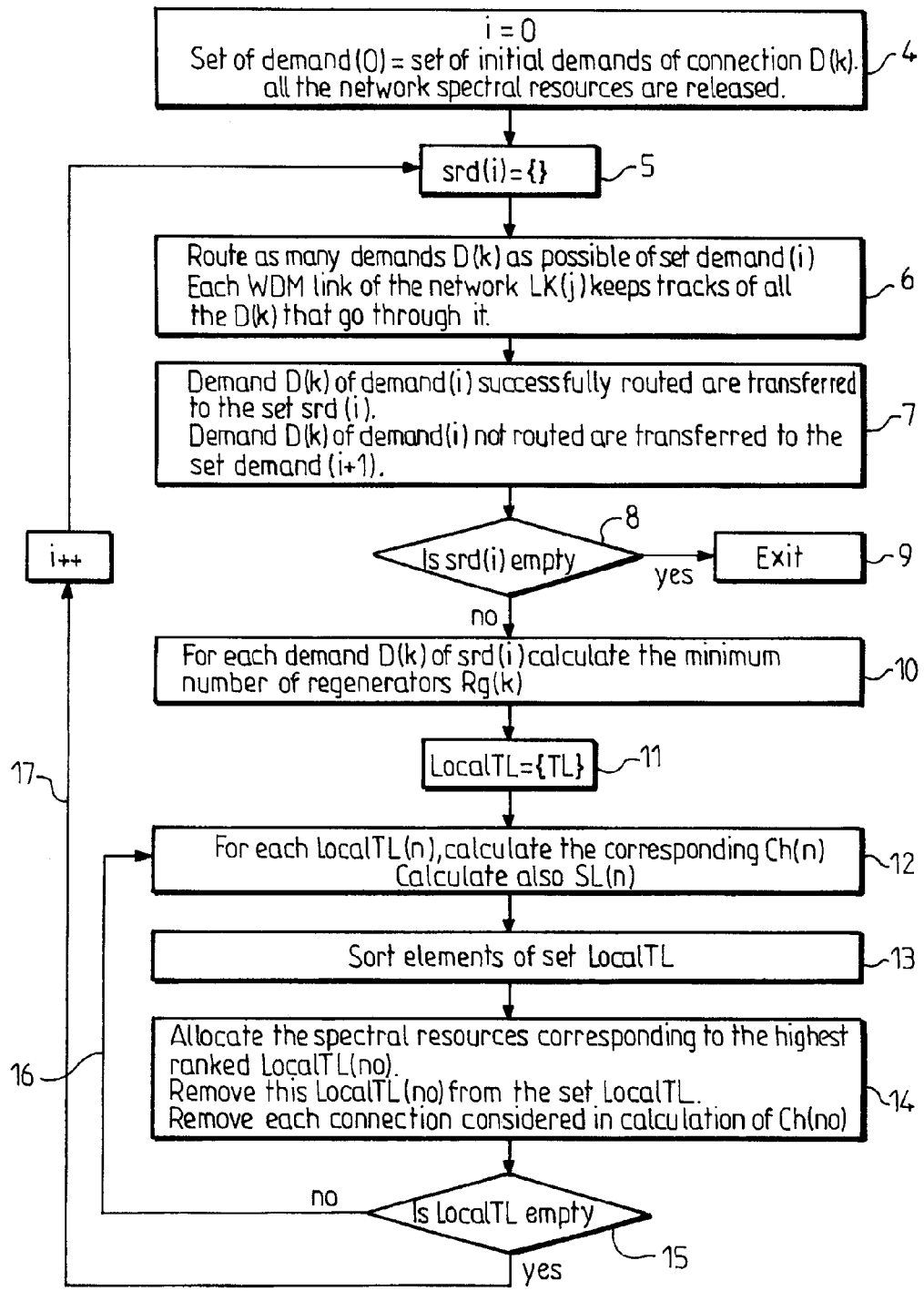
FIG. 2 is a flow diagram showing an embodiment of a method according to the invention.

The next step that is not shown on FIG. 2 consists in the concrete allocation of the superchannels. This step associates to each superchannel the corresponding optical slots regularly spaced along the optical transmission window.

Figure 3:
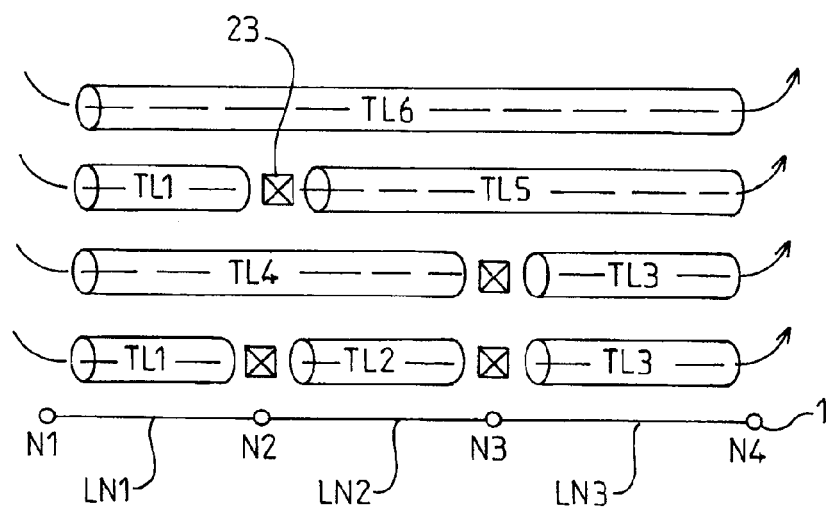
FIG. 3 is a schematic representation of combinations of candidate lightpaths that can be associated to a connection demand.

An example of successive iterations made with the above method on a subset of connection demands will now be illustrated in a very simple case with reference to FIG. 3. The WDM optical network considered comprises four nodes N1, N2, N3 and N4 successively linked by three links 2. The iterations are made on a subset of connection demands comprising only one connection demand 3. The connection demand 3 (D1) is a request for a certain capacity between the node N1 and the node N4.

In the step 6, the connection demand 3 is routed in along the successive link LN1, LN2 and LN3 between nodes N1, N2, N3 and N4. Each link has a list of connection demands routed by this link. As the connection demand is routed in LN1, LN2 and LN3, the connection demand 3 is added to the lists corresponding to those three links.

In the step 11, a set of candidate lightpaths is determined. This set of candidate lightpaths consists in the list of all the possible candidate lightpaths that may be used in the network. Those candidate lightpaths are TL1, TL2, TL3, TL4, TL5 and TL6.

In the step 12, the matching connection demands are determined for each candidate lightpath. A connection demand is a matching connection demand for a candidate lightpath if a non-allocated subpath of this connection demand comprises each of the links making up the candidate lightpath.

Here the connection demand 3 is routed in all the links between N1 and N4, therefore, the connection demand 3 is a matching connection demand for each candidate lightpath.

The method further selects in step 14 the candidate lightpath having the highest admissible spectral resource saving. In this example we assume that TL3 is selected. The selected candidate lightpath is considered as a lightpath to be established and the candidate lightpath TL3 is removed from the set of candidate lightpaths.

In addition, because of the selection of the candidate lightpath TL3, the connection demand 3 is removed from the list of connection demands routed by the link LN3.

The method then iterates back to the step 7 of determining the matching connection demands and executes it for each remaining candidate lightpath. Therefore, in this second iteration, because the candidate lightpath TL3 was removed in the first iteration, the matching connection demands are now determined for the set of candidate lightpaths TL1, TL2, TL4, TL5 and TL6.

The connection demand 3 is no more in the list of connection demands routed by the link LN3 because the link LN3 now corresponds to an allocated subpath of connection demand 3. Furthermore, since link LN3 takes part in the candidate lightpaths TL5 and TL6, the connection demand 3 is no more considered as a matching connection demand for the candidate lightpaths TL5 and TL6. Thus, the candidate lightpaths for which demand 3 is a matching connection demand are now TL1, TL2 and TL4.

Again, the method selects the candidate lightpath having the highest admissible spectral resource saving. We assume that this is TL4 in this first example. The selected candidate lightpath is considered as a lightpath to be established. The candidate lightpath TL4 is removed from the set of candidate lightpaths and the connection demand 3 is removed from the list of connection demands routed by the links LN1 and LN2 corresponding to the candidate lightpath TL4 because the links LN1 and LN2 now correspond to an allocated subpath of connection demand 3.

The method terminates because no more connection demands are in the list of connection demands routed by any link, i.e. there does not remain any non-allocated subpath for any of the connection demands. The resulting succession of lightpaths to be established is TL4 and TL3.

As a second example, we assume that the selected candidate lightpath is TL1 in the second iteration: TL1 is removed from the set of candidate lightpaths and the connection demand 3 is removed from the list of routed demands of LN1.

The method iterate back to the step 12 of determining the matching connection demands as there is still a connection demand in the list of routed demands of link LN2. The candidate lightpath considered are now TL2, TL4, TL5 and TL6. The only candidate lightpath for which all the links making up this candidate lightpath comprises the connection demand 3 in their respective list of connection demands routed is TL2. Indeed, the connection demand is no more present in the list of routed demands of links LN1 and LN3. Links LN1 and LN3 are allocated subpaths of connection demand 3 which are included in candidate lightpaths TL4, TL5 and TL6. So candidate lightpaths TL4, TL5 and TL6 do not match the connection demand 3. Connection demand 3 matches only candidate lightpath TL2.

Therefore TL2 is selected in the third iteration as a lightpath to be established. The succession of lightpaths to be established becomes TL1, TL2 and TL3.

In FIG. 3, regenerators 23 are indicated as a checked box. The simple examples described above shows that a different number of regenerators will be used for a given connection demand depending on which candidate lightpaths are selected as lightpaths to be established: one regenerator for the selection of TL4 and TL3, two regenerators for the selection of TL1, TL2 and TL3.

It may be desirable to control the average number of regenerators 23 used when selecting the lightpaths. Indeed, regenerators are opto-electronical devices that are expensive and power greedy.

To that aim, the minimum number of regenerators, MinReg$_k$, needed to fulfil a connection demand is estimated in step 10 for each routed connection demand D$_k$ according to the spatial path found by routing the connection demand in the step 6.

A function OverRegen[x] is defined. In the step 12, a connection demand is a matching connection demand for a given candidate lightpath if the induced number of regenerators necessary to fulfil the connection demand does not imply for this connection demand more regenerators than the threshold OverRegen[MinReg$_k$]. This induced number is called the virtual regeneration number. If this condition is not true then the connection demand is not a matching connection demand.

In order to compute the virtual regeneration number of a connection demand, the non-allocated subpaths of the connection demand should be determined. The non-allocated subpaths are parts of the spatial path of the connection demand that does not yet comprise any link of the lightpaths to be established for which the connection demand is a matching connection demand.

A first regeneration counter is computed as a function of the number of lightpaths associated to the connection demand. That means, for each lightpath to be established surrounded by two non-allocated subpaths the counter is incremented by two, for each lightpath to be established surrounded by only one non-allocated subpaths the counter is incremented by one and for each lightpath to be established surrounded by no non-allocated subpaths the counter is not incremented.

A second regeneration counter estimates the number of regenerations on the non-allocated subpaths as a function of physical impairments.

When determination is made of the matching connection demands for a candidate lightpath, determination is made of an induced number of additional regenerators, i.e. by how many regenerators would the first counter be incremented if the candidate lightpath were selected as a lightpath to be established.

The induced number of additional regenerators is equal to two if the candidate lightpath is surrounded by two non-allocated subpaths of the connection demand, equal to one if the candidate lightpath is surrounded by only one non-allocated subpaths and equal to zero for a candidate lightpath surrounded by no non-allocated subpaths the counter is not incremented. In addition, the second regeneration counter is updated so as to be an estimation of the number of regenerations on the remaining non-allocated subpaths if the candidate lightpath were selected as a lightpath to be established.

The virtual regenerations number is equal to the sum of the first and second regeneration counters and the induced number of additional regenerators.

The function OverRegen[x] is greater or equal than the function f[x]=x. For instance this function could be defined as "Ax+B" where A and B are constant and A≥1 and B≥0. Hence, by adjusting the parameters A and B of the function OverRegen[x], it is possible to control the amount of extra regenerators accepted. This control avoids the utilization of a too large number of regenerators per connection and enables to control the trade-off between the total capacity transported inside the network and the average number of regenerators needed to do so.

To illustrate the influence of regenerators in the determination of the matching connection demands, the same example as above will be enriched with in which two more connection demands: The connection demand D2 is routed from the node N1 to the node N3 and the connection demand D3 is routed from the node N2 to the node N4.

In the step 12 of the first iteration, to determine the matching connection demands, a table which associates binary information to each possible couple of a candidate lightpath and a connection demand is determined. Table 2 is an example of such an associated table.

TABLE 2

|     | D1 | D2 | D3 |
|-----|----|----|----|
| TL1 | 1  | 1  | 0  |
| TL2 | 1  | 1  | 1  |
| TL3 | 1  | 0  | 1  |
| TL4 | 1  | 1  | 0  |
| TL5 | 1  | 0  | 1  |
| TL6 | 1  | 0  | 0  |

For instance, in the table above, each "1" in a field of the table means that all the links of the candidate lightpath related to this field routes the connection demand related to this field.

After selecting a candidate lightpath in this step, a test is made for each remaining candidate lightpath to see if the selected candidate lightpath intersects with the respective candidate lightpath. By intersection, it is understood that at least one link of the selected candidate lightpath is shared with the respective candidate lightpath.

The binary information is then updated. In the above mentioned table, the columns of the matching connection demands of the selected lightpath are updated by setting to zero the value related to the candidate lightpaths that intersect the selected lightpath. The modified table is used in the second iteration to determine the matching connection demands for the remaining candidate lightpath.

For instance, TL3 is selected in the first iteration and has two matching demands D1 and D3. TL3 intersects TL6 and TL5. Therefore, the fields between the line TL5 and TL6 and the columns D1 and D3 are set to zero. As a consequence, the table that will be used in the second iteration is illustrated by the Table 3.

TABLE 3

|     | D1 | D2 | D3 |
|-----|----|----|----|
| TL1 | 1  | 1  | 0  |
| TL2 | 1  | 1  | 1  |
| TL4 | 1  | 1  | 0  |
| TL5 | 0  | 0  | 0  |
| TL6 | 0  | 0  | 0  |

The example of the successive iterations described in the example according to FIG. 3 will now be described when taking into consideration the number of regenerators 23 induced by the selecting of a candidate lightpath.

A regenerator is a network device situated between links. A regenerator regenerates an optical signal between two transparent lightpaths.

A minimum regeneration number is estimated on the basis of estimated physical impairment along the spatial path determined in the step 6 of routing the connection demands. In this case we assume that the minimum number is zero, which means the connection demand 3 is short enough to be can be fulfilled using only one lightpath. A threshold is calculated on the basis of the minimum regeneration number.

In this example the threshold is the minimum number of regenerators plus one. Therefore the threshold is now equal to one.

An additional condition is added in the method to determine a matching connection demand of the step 12: the virtual regeneration number induced by the possible matching of a connection demand for a candidate lightpath should not be higher than the threshold. The virtual number of regenerations is also calculated on the basis of the number of regenerators induced by the candidate lightpath if it becomes a lightpath to be established and an estimated number of regenerator needed to fulfil the parts of the connection demands which were not included in the already selected lightpaths to be established.

For instance, when testing if the connection demand 3 is a matching connection demand for candidate lightpath TL2, it is taken into consideration that fulfilling connection demand 3 with candidate lightpath TL2 would imply the use of a regenerator at both end of TL2. Then, the virtual regeneration number would be higher than the threshold. Therefore the test result is that the connection demand 3 is not a matching connection demand for TL2.

Therefore, in the first iteration, the connection demand 3 is a matching connection demand only for TL1, TL3, TL4, TL5 and TL6.

Assuming TL3 is selected as a lightpath to be established in the first iteration, the first counter of regenerations for the connection demand 3 is now 1. Therefore, in the second iteration, the connection demand 3 is not a matching connection demand for TL2 and TL1 as it would imply to add one more regenerator and therefore have a virtual number of regeneration is equal to two and therefore greater than the threshold. Therefore, the connection demand 3 is a matching connection demand only for TL4 in the second iteration through loop 16.

With this additional condition, the only possibility when TL3 is selected in the first step is to select TL4 in the second step. Therefore, the objective of not using more than one regenerator is achieved.

The above described method of allocation with control of regenerators' number will now be compared with standard wavelength allocations in the case of a North European Backbone Network.

An optical network has been numerically simulated. The parameters of the simulated network are:
- The network comprise 34 nodes and 49 bidirectional WDM links,
- the shortest and longest links are 180 km and 1110 km long,
- the granularity of the connection demands is 100 Gb/s,
- the maximum transparent reach is 1500 km,
- the distribution of the traffic matrix is: 30% between one-hop and two hops, 30% between three-hops and five hops, 24% between six-hop and eight-hops and 16% beyond eight hops, The average number of connections and the corresponding average number of regenerators per connection are determined for several configurations on the statistical data derived from 100 different randomly-made traffic distributions. The average number of connections corresponds to the averaged maximum number of connection demands the network can transport with an average blocking ratio of 1%.

The larger the average number of connections is, the more efficient the resource allocation is. The lower the average number of regenerators is, the less expensive the network is.

On a standard configuration A corresponding to the allocations aligned on regular 50 GHz ITU grid, the average number of connections is 447 connections and the average number of regenerators is 3.6 regenerators per connection.

In a configuration B, the standard channel spacing is reduced from 50 GHz down to 35 GHz. Since all the links adopt exactly the same new grid aligned on 35 GHz, the wavelength allocation complexity remains unchanged as compared to the current standard configuration A. This reduction of the standard channel spacing increases the average number of connection by 42.3% and the average number of regenerators by 31.7%.

In the configuration G the network is opaque and all the optical signals are regenerated at each node with a gridless allocation of the wavelength related only to the length of each link. The resulting average number of connections is 76.5% higher with respect to the standard configuration A and the average number of regenerators per connection is 120.8% higher. Therefore, this opaque network corresponds to a large total capacity but at the expense of a huge increase of the required number of regenerators per connection.

The configuration H stands for the above described allocation method where OverRegen[x]=x. It appears that the configuration H increases by 35.3% the average number of connections with respect to the standard configuration A and by only 2.2% the average number of regenerators. Therefore, the method consumes less additional regenerators per connection compared to the configurations B and G while it is as nearly as efficient as the configuration B.

The methods described hereinabove may be executed through the use of dedicated hardware as well as hardware capable of executing software in association with appropriate software. When provided by a processor, the corresponding functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and nonvolatile storage. Other hardware, conventional and/or custom, may also be included.

The invention is not limited to the described embodiments. The appended claims are to be construed as embodying all modification and alternative constructions that may be occurred to one skilled in the art, which fairly fall within the basic teaching here, set forth. The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The invention may be implemented by means of hardware as well as software. The same item of hardware may represent several "means". In the claims, any reference signs placed between parentheses shall not be construed as limiting the scope of the claims.

The invention claimed is:

1. A method for allocating spectral capacity in an optical network comprising the steps of:
   receiving a connection demand specifying a source node, a destination node and a capacity;
   routing the connection demand to define a set of links connecting the source node and the destination node;
   adding the connection demand to a connection demand list associated with each link in the set of links;
   determining a set of candidate lightpaths, where each candidate lightpath provides connectivity over one or more links belonging to the set of links;
   determining a set of connection demand matching lightpaths by selecting candidate lightpaths providing connectivity over an unallocated subpath, the unallocated subpath having one or more links where each link has the connection demand in the connection demand list;
   determining a spectral resource saving for each connection demand matching lightpath;
   allocating a subpath by selecting a connection demand matching lightpath based on spectral resource saving and by deleting the connection demand from the connection demand list of each link having connectivity provided by the selected connection demand matching lightpath; and
   if another unallocated subpath remains, repeating the steps of determining a set of connection demand matching lightpaths and allocating.

2. The method of claim 1, wherein the step of allocating further comprises selecting the connection demand matching lightpath based on a number of regenerations associated with the connection demand matching lightpath.

3. The method of claim 2, wherein the number of regenerations does not exceed a threshold.

4. The method of claim 3, wherein the threshold is a function of regenerations in allocated subpaths.

5. The method of claim 1, wherein the step of determining a spectral resource saving is based on channel spacing.

6. The method of claim 1, wherein the step of determining a spectral resource saving is based on signal modulation type.

7. The method of claim 1, wherein the step of determining a spectral resource saving is based on a cost parameter.

8. A non-transitory computer readable storage medium configured to store a program comprising executable instructions for a method of allocating spectral capacity in an optical network when the program is run on a programmable device, the method comprising the steps of:
   receiving a connection demand specifying a source node, a destination node and a capacity;

routing the connection demand to define a set of links connecting the source node and the destination node;

adding the connection demand to a connection demand list associated with each link in the set of links;

determining a set of candidate lightpaths, where each candidate lightpath provides connectivity over one or more links belonging to the set of links;

determining a set of connection demand matching lightpaths by selecting candidate lightpaths providing connectivity over an unallocated subpath, the unallocated subpath having one or more links where each link has the connection demand in the connection demand list;

determining a spectral resource saving for each connection demand matching lightpath;

allocating a subpath by selecting a connection demand matching lightpath based on spectral resource saving and by deleting the connection demand from the connection demand list of each link having connectivity provided by the selected connection demand matching lightpath;

and if another unallocated subpath remains, repeating the steps of determining a set of connection demand matching lightpaths and allocating.

9. The program of claim 8, wherein the step of allocating further comprises selecting the connection demand matching lightpath based on a number of regenerations associated with the connection demand matching lightpath.

10. The program of claim 9, wherein the number of regenerations does not exceed a threshold.

11. The program of claim 10, wherein the threshold is a function of regenerations in allocated subpaths.

12. The program of claim 8, wherein the step of determining a spectral resource saving is based on channel spacing.

13. The program of claim 8, wherein the step of determining a spectral resource saving is based on signal modulation type.

14. The program of claim 8, wherein the step of determining a spectral resource saving is based on a cost parameter.

* * * * *